July 9, 1946.                I. W. DOYLE ET AL                 2,403,587
                              CAMERA MAGAZINE
                           Filed Nov. 13, 1943              9 Sheets-Sheet 4
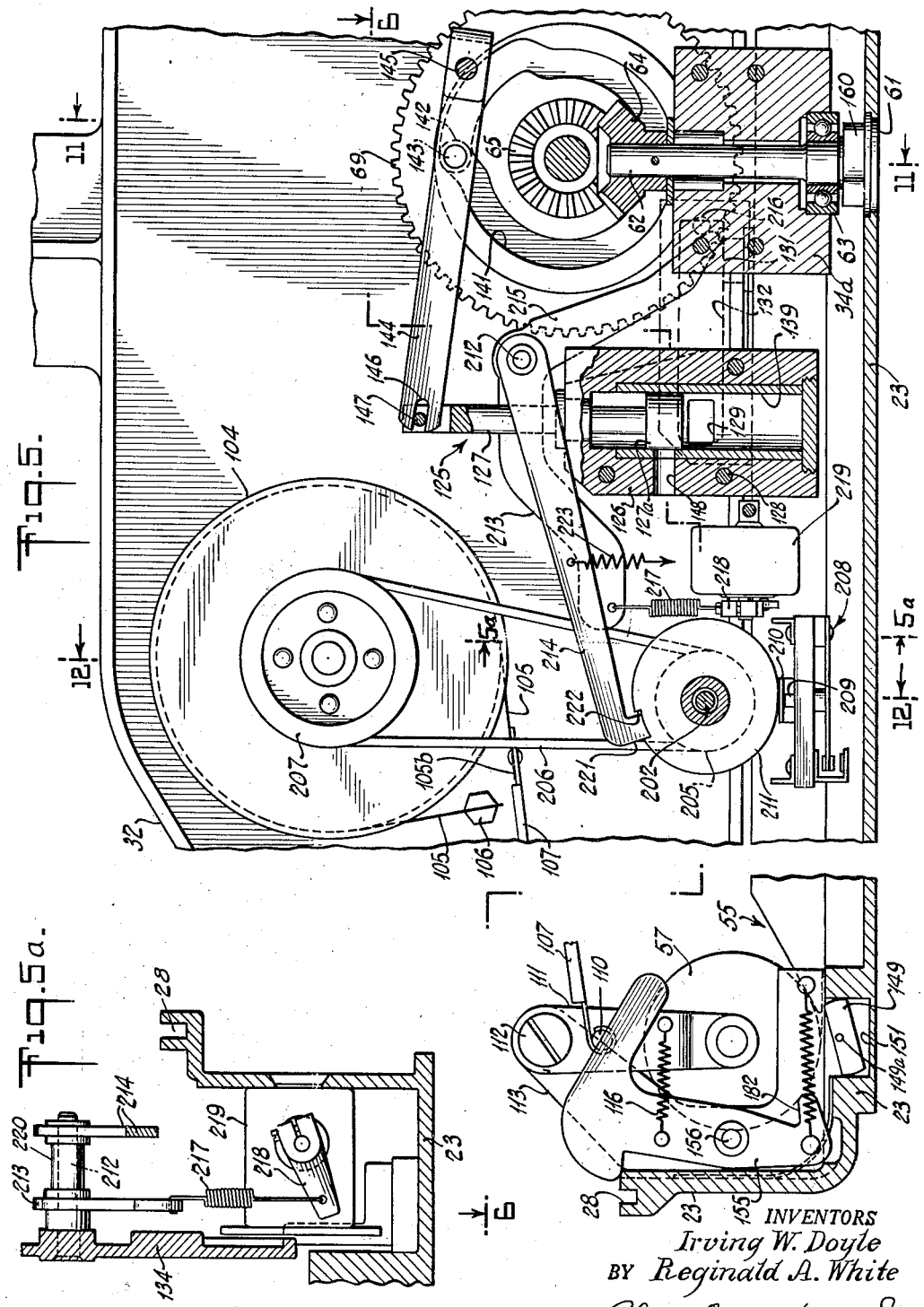
INVENTORS
Irving W. Doyle
BY Reginald A. White
Blair, Curtis + Hayward
ATTORNEYS

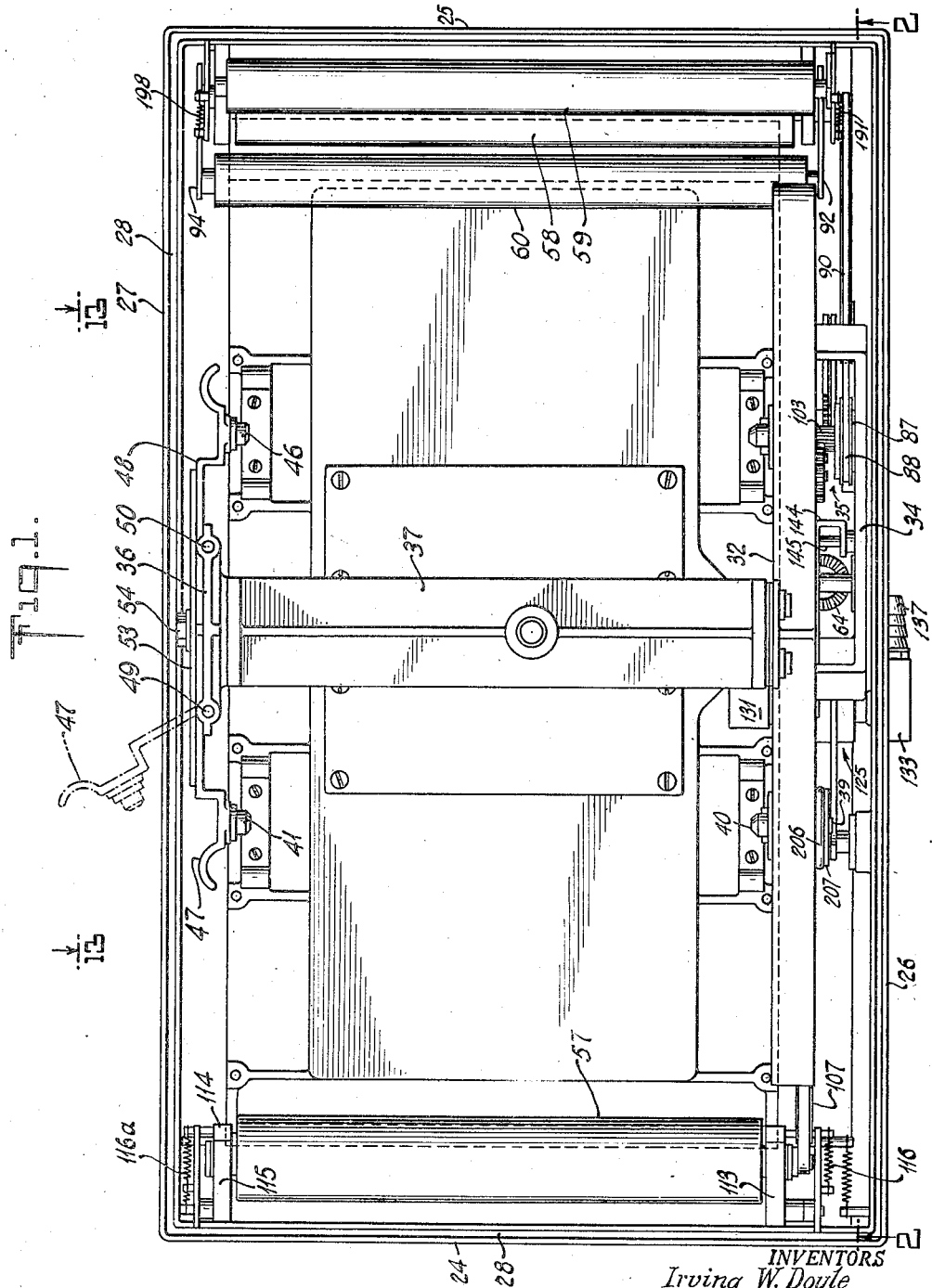

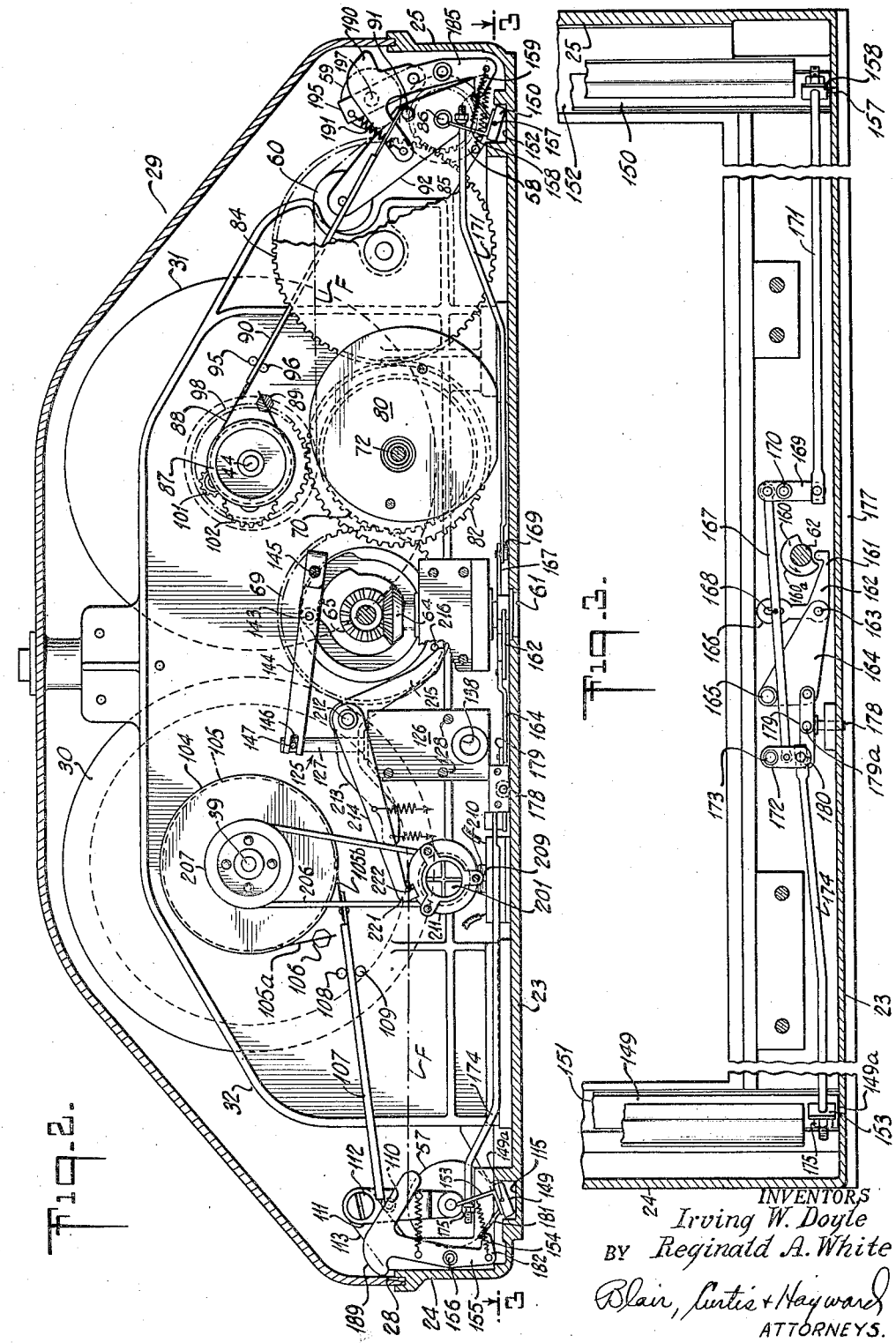

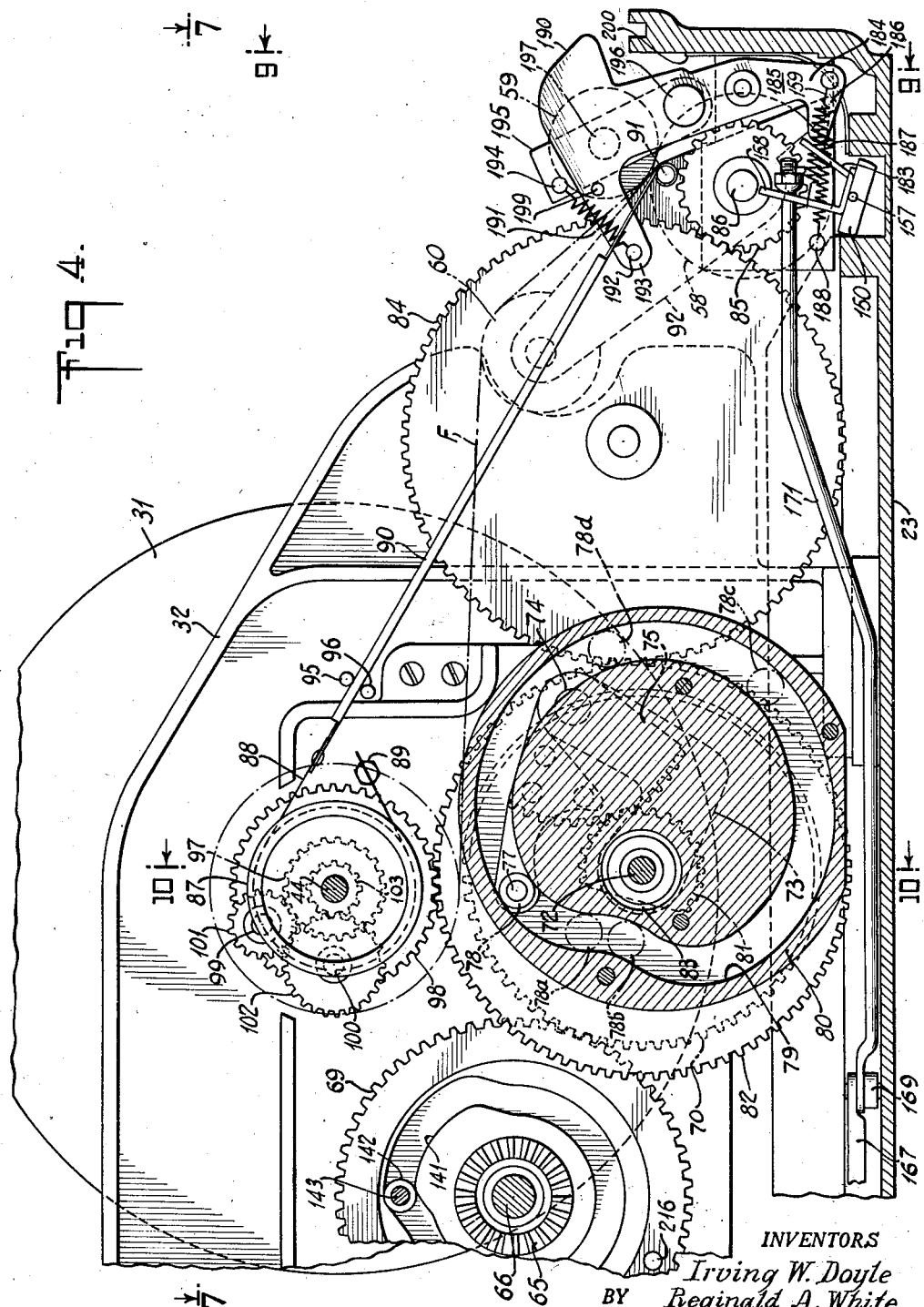

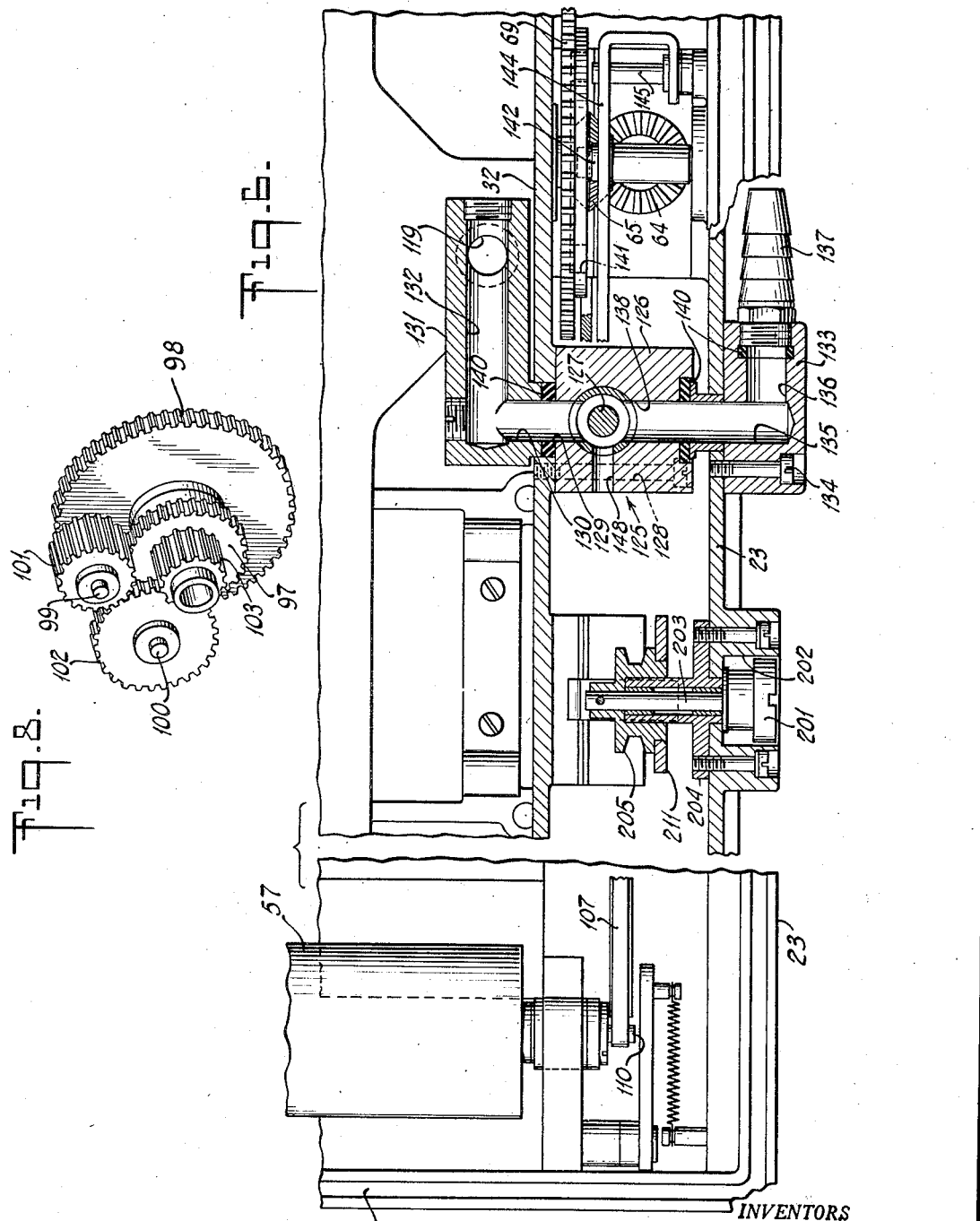

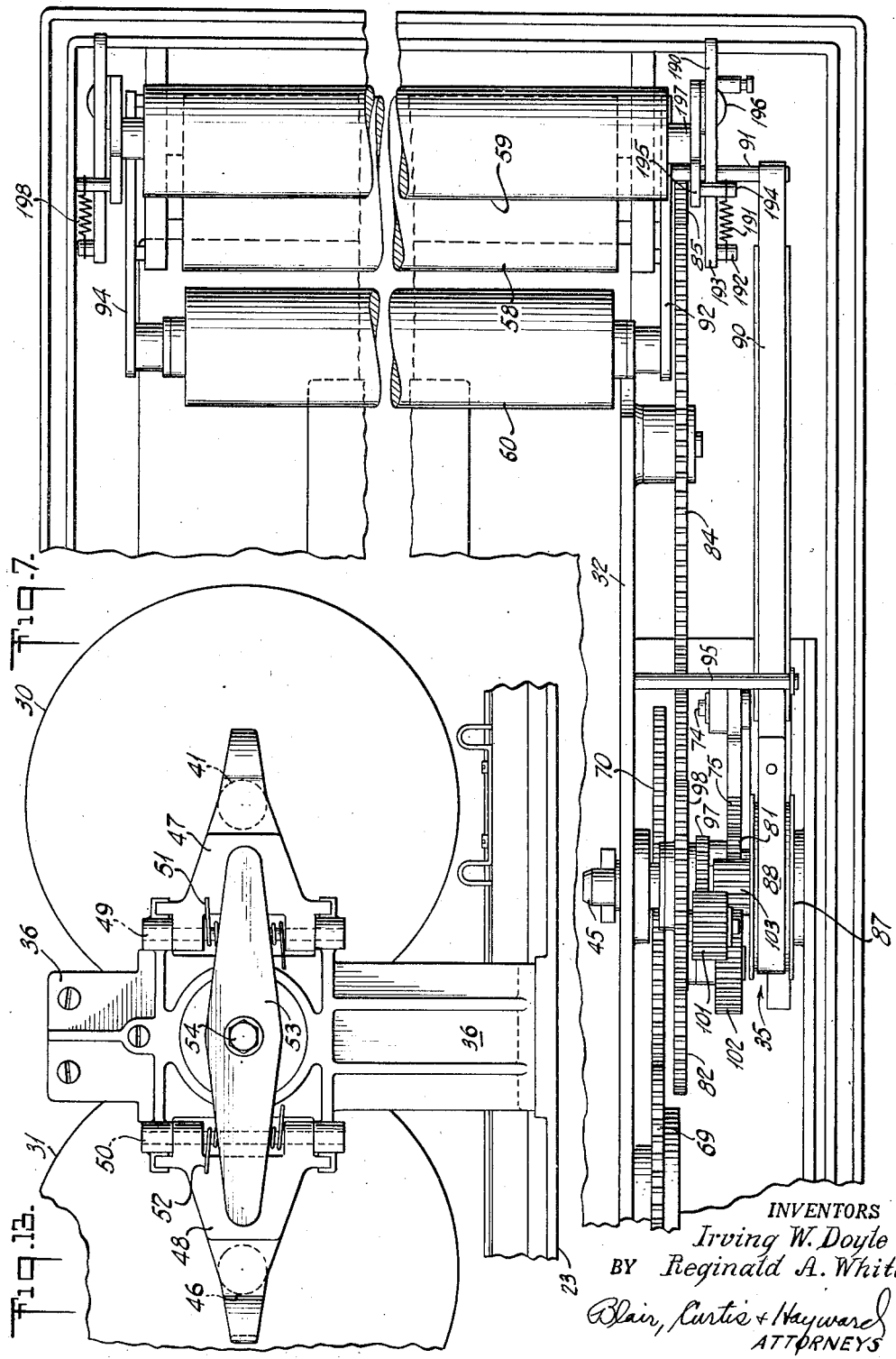

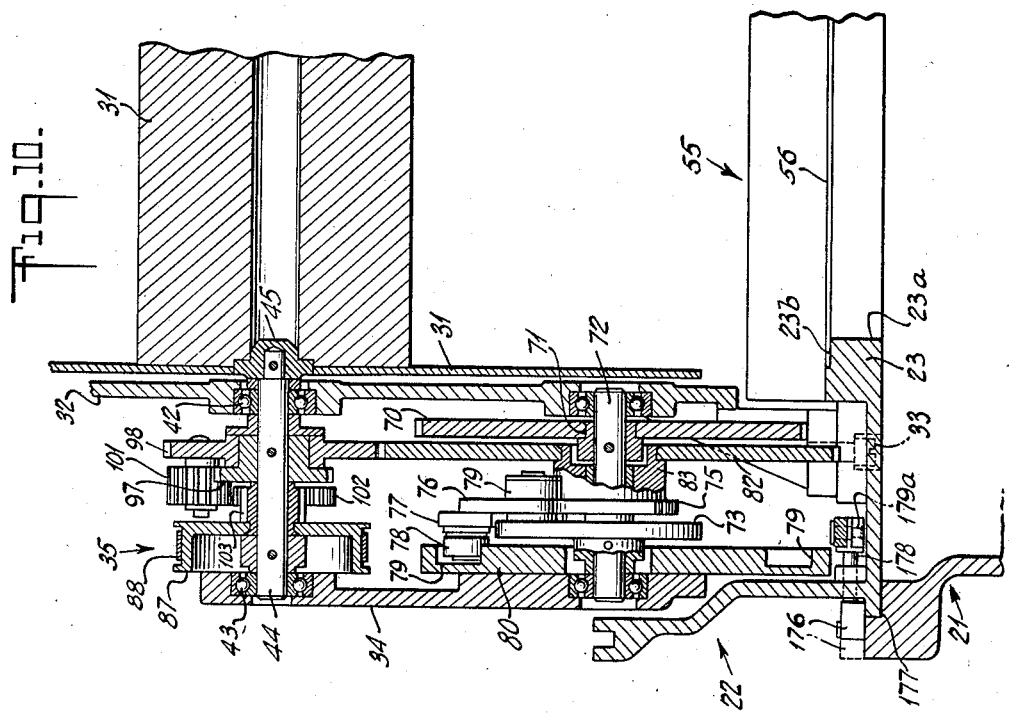

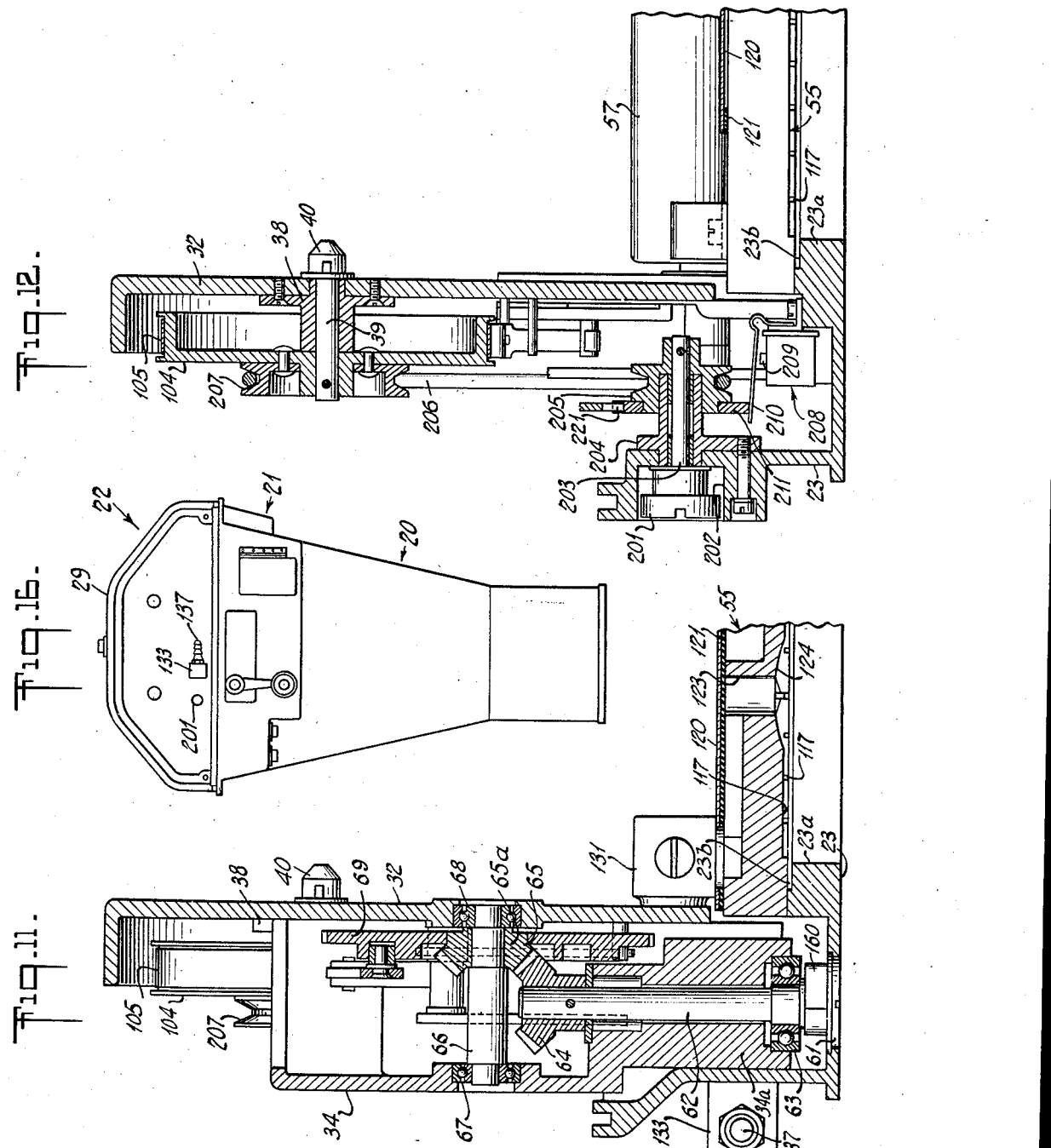

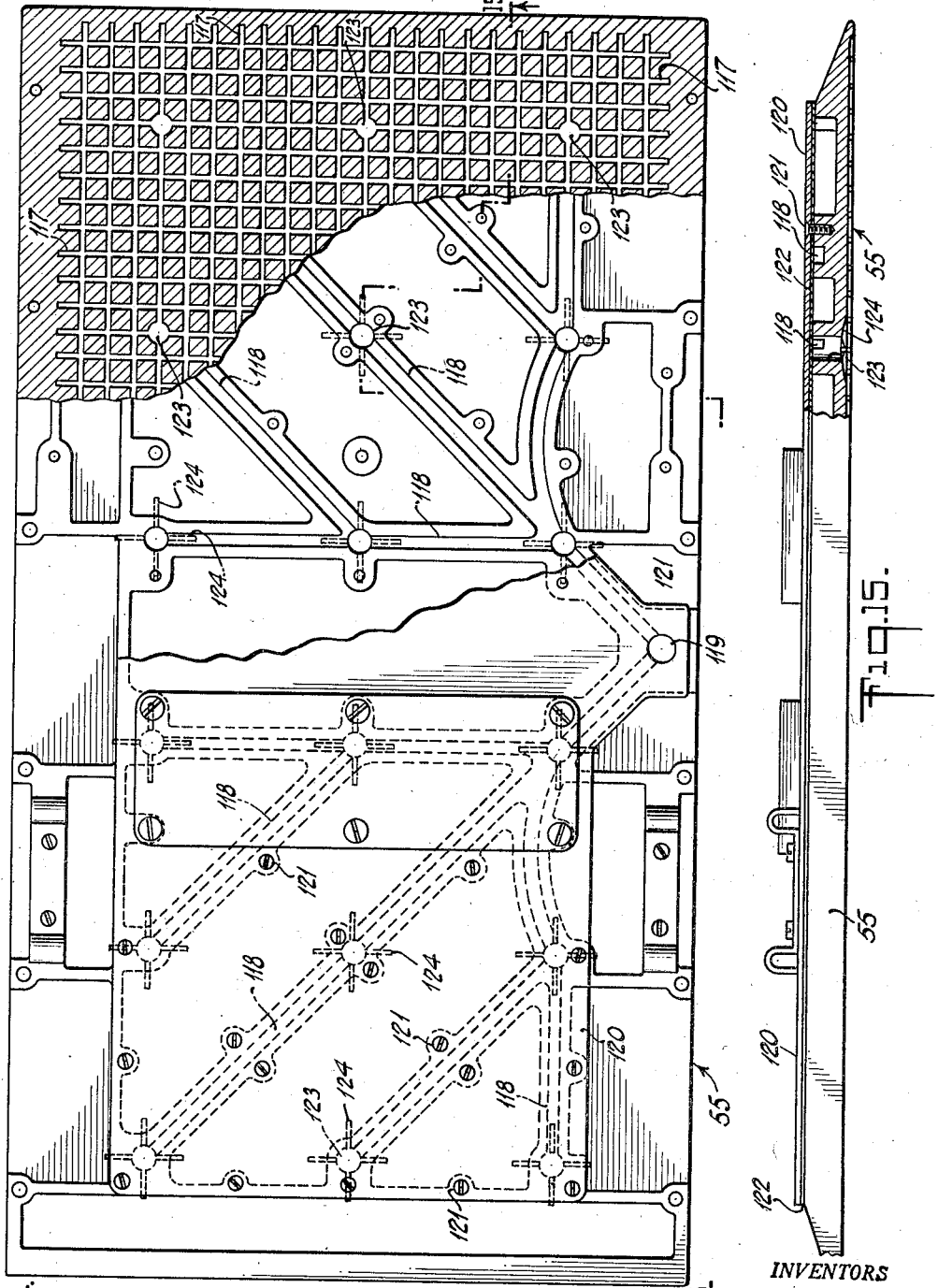

Patented July 9, 1946

2,403,587

UNITED STATES PATENT OFFICE 2,403,587

CAMERA MAGAZINE

Irving W. Doyle, Massapequa, and Reginald A. White, Pleasantville, N. Y., assignors to Fairchild Camera and Instrument Corporation, a corporation of Delaware Application November 13, 1943, Serial No. 510,146

10 Claims. (Cl. 95—34)

This invention relates to cameras, and more particularly to a magazine adapted to be detachably secured to an aerial camera.

Aerial camera magazines of the character here under consideration are designed to carry strip film which, in the case of a large camera capable of taking pictures 9" x 18", for example, has considerable weight. Cameras of this type are used for mapping and reconnaissance work, and most of the cameras in present use are war-time adaptations of conventional aerial mapping cameras. The exigencies of war-time applications of these cameras, however, demonstrated that the film capacity thereof was insufficient, one reason for which being that it is often necessary to mount the camera in an inaccessible position in the aircraft, thus making it difficult if not impossible to effect magazine interchange to renew the film supply during a mission.

It further became evident that available forms of magazines could not be overloaded thus to increase the film carrying capacity and still operate efficiently, by reason of difficulties arising through the substantially increased factors of inertia and momentum of the loaded film supply and take-up spools. Additional difficulties were encountered in accurately metering the film where an extremely large quantity thereof was loaded in the magazine because of the very substantial variation in the diameter of the roll of film on the spools during the taking of a large number of successive photographs.

Still further difficulties were encountered in properly supporting the heavily loaded supply and take-up spools, particularly during evasive action of the aircraft, during which the aircraft and accordingly the camera is subjected to violent stresses by reason of the evolutions of the aircraft.

It is accordingly among the objects of this invention to provide a large capacity magazine for an aerial camera which is extremely sturdy and durable in construction, efficient and dependable in operation, and capable of obviating the above-mentioned difficulties in addition to others in a practical and efficient manner.

The invention accordingly consists in the features of construction, combinations of elements, and arrangements of parts as will be exemplified in the structure to be hereinafter described, and the scope of the application of which will be indicated in the following claims.

In the drawings, wherein we have shown one form of our invention,

Figure 1 is a top plan view of the magazine with the cover thereof removed to illustrate various internal mechanisms;

Figure 2 is a sectional elevation taken along the line 2—2 of Figure 1;

Figure 3 is a fragmentary horizontal section taken along the line 3—3 of Figure 2;

Figure 4 is an enlarged fragmentary vertical section showing in greater detail the mechanism shown in the right-hand portion of Figure 2;

Figure 5 is an enlarged fragmentary vertical section showing in greater detail the mechanisms in the left-hand portion of Figure 2;

Figure 5A is a fragmentary section taken along the line 5A—5A of Figure 5;

Figure 6 is a fragmentary horizontal staggered section taken along the line 6—6 of Figure 5;

Figure 7 is an enlarged fragmentary horizontal section taken along the line 7—7 of Figure 4;

Figure 8 is a perspective view of a planetary-like gear system comprising a part of the film take-up spool clutch;

Figure 9 is a vertical section taken along the line 9—9 of Figure 4;

Figure 10 is a fragmentary vertical section taken along the line 10—10 of Figure 4;

Figure 11 is a fragmentary vertical section taken along the line 11—11 of Figure 5;

Figure 12 is a fragmentary vertical section taken along the line 12—12 of Figure 5;

Figure 13 is an enlarged fragmentary elevation of a portion of the film supply and take-up spool support as viewed along the line 13—13 in Figure 1;

Figure 14 is a top plan view of the camera vacuum back against which the film is held flat at the focal plane during an exposure, portions of this view being broken away to illustrate various structural details of this element;

Figure 15 is a staggered section taken along the line 15—15 of Figure 14; and

Figure 16 is a side elevation of an aerial camera including our film magazine.

Similar reference characters refer to similar parts throughout the various views of the drawings.

In Figure 16, we have shown an aerial camera which consists of a cone-shaped body 20 in which the lens and shutter is disposed, a body 21 in which is contained the camera driving motor and the main camera winding mechanism, and our roll film magazine generally indicated at 22 which is adapted to be detachably mounted on the body. The camera is adapted to be mounted on aircraft often in a position wherein it is inaccessible during flight, and accordingly the camera is fully automatic and remotely controllable by the proper individual of the aircraft personnel. The following description, however, is directed solely to magazine 22.

As shown in Figure 2, magazine 22 includes a base casting 23 having four upwardly extending sides 24, 25, 26 (Figure 1) and 27, the upper edges of which are provided with a continuous groove or slot 28 in which is received the edge of a cover 29 which is detachably secured on the magazine to cover the operating mechanisms therewithin. Thus base 23, the walls extending therefrom, and cover 29, form an enclosure in which are disposed a film supply spool 30, a film take-up spool 31 and various operating mechanisms therefor which will be described in detail below.

Disposed within the above-described enclosure is an upstanding bracket or support 32 (Figure 10) which is fastened to base 23 by suitable screws 33 and which, as shown in Figure 2, forms a partition which lies between the film spools 30 and 31 and the operating mechanism therefor. Secured to partition 32 in any suitable manner is a casting 34 (Figure 10) which, with the partition, comprises a unitary sub-assembly generally indicated at 35, constituting practically the entire operating mechanism. Thus it may be seen that this sub-assembly 35 is fastened to the base 32 of the magazine by screws 33 so as readily to be installable or removable with respect thereto as a unit. At that side of the base casting 32 opposite from the assembly 35 is an upright casting 36 (Figure 1) which is fastened to the base casting 32 in any suitable manner. Casting 36 is tied to partition 32 by a tie plate 37 fastened at its opposite ends to the partition and casting by suitable screws. Thus the assembly is sufficiently rigid to withstand the substantial stresses to which the camera is subjected during use.

As shown in Figure 12, casting 32 has secured to the left-hand side thereof a bearing element 38 which rotatably receives a spindle 39 on the right-hand of which is fastened a pivot 40 adapted to enter into one end of the film supply spool 30 (Figure 2). The other end of the film supply spool is received on a pivot 41 (Figure 1) which is movable between its solid and dotted line positions, as will be described in greater detail hereinafter.

*Film spool mounts (Figures 1 and 13)*

As shown in Figure 10, partition 32 also has mounted therein a small ball bearing 42 which is coaxial with a similar bearing 43 mounted in casting 34 and these two bearings rotatably mount a spindle 44 to the inner end of which is fastened a pivot 45 adapted to receive one end of the film take-up spool 31. The other end of the take-up spool 31 is mounted on a pivot 46 (Figure 1), which is movable toward and away from the take-up spool in the same manner as supply spool pivot 41. Thus pivots 41 and 46 are respectively mounted on arms 47 and 48 which are hinged to casting 36 by means of pins 49 and 50. This hinged connection permits the arms 47 and 48 to be swung toward and way from their respective film spools to permit insertion and removal of the spools from the magazine.

As is better shown in Figure 13, springs 51 and 52 are respectively associated with pins 49 and 50 and bear respectively against arms 47 and 48 to bias these arms into their spool engaging position, as shown in solid lines in Figure 1. Preferably we provide a bar 53, pivoted as at 54 to upright casting 36 and adapted to be swung to the position shown so that its ends lie in back of arms 47 and 48, thus to prevent swinging of the arms against the bias of their springs from their spool engaging position. Hence the spools are prevented from becoming dislodged accidentally during operation of the camera. When it is desired to remove the spools from the magazine, bar 53 may be rotated 90°, whereupon arms 47 and 48 may be pivoted about their respective pins, thus permitting removal of the film supply and take-up spools. Preferably there is a spring (not shown) associated with bar 53 and its pivot, which biases the bar to its horizontal position shown in Figure 13, so as to preclude any possibility of the bar remaining in its unlocked position after the film spools are in place. Although springs 51 and 52 press arms 47 and 48 together with their spool pivots 41 and 46 into spool engaging position, these springs are not sufficiently strong to support the full weight of the loaded spools in the event that the magazine should become tilted during operation. Thus it will appear that bar 53 locks the spool pivot supporting arms in proper operative position, assuring maintenance of the film spools in their proper positions during operation of the camera.

*Film feeding mechanism (Figures 2, 4, 9, 10, 11)*

Fastened to magazine base 23 (Figure 10) is a focal plane casting, generally indicated at 55, which is secured to the magazine base in any suitable manner over an aperture 23a in the base. The edges of base 23 on opposite sides of aperture 23a are slightly recessed to form opposed grooves, such as groove 23b, between the focal plane casting 55 and base 23 for the passage of film. Thus when the film is loaded in the magazine, the leading end thereof is drawn from the film supply spool 30 (Figure 2), is passed over a guide roller 57 (Figures 2 and 5) between focal plane casting 55 (Figure 10) and base casting 23, around a drive roller 58, beneath a pressure roller 59 (Figure 4) over a tension roller 60 and thence onto the take-up spool 31 where it may be secured in any suitable manner as, for example, by a piece of tape. Thus, as will now be described, the film is drawn from the supply spool in accurate amounts through the operation of the mechanism in assembly 35 (Figure 10) which drives the feed roller 58 (Figure 7) and also the take-up spool 31 (Figure 10).

The entire film magazine mechanism is operated from the camera winding mechanism in body 21 (Figure 16) by means of a slotted coupling 61 (Figures 2 and 11), the bottom surface of which is flush with the bottom of base 23. Coupling 61 (Figure 11) is fastened to the lower end of a shaft 62 journaled by a ball bearing 63 mounted in the lower portion 34a of casting 34. To the upper end of shaft 62 is attached a bevel gear 64 which meshes with a bevel gear 65 secured on one end of a stud shaft 66 journaled at its opposite ends in ball bearings 67 and 68 mounted respectively in casting 34 and bracket 32. Bevel gear 65 includes a hub portion 65a on which is fastened a large spur gear 69 (see Figure 2) which meshes with a gear 70 which, as shown in Figure 10, is secured to a hub 71 pinned to a shaft 72, the opposite ends of which are mounted in ball bearings secured respectively in casting 34 and bracket 32.

Also pinned to shaft 72 is an arm 73 (Figure 4) which carries a stud 74 on which is mounted a gear sector 75. Gear sector 75 (Figure 10) includes an arm 76 to which is fastened a stud 77 rotatably carrying a roller or cam follower 78. Follower 78 extends into a groove 79 formed in a fixed cam 80 which may be fastened in any suitable manner to casting 34. Thus, as shaft 72 rotates, arm 73 and accordingly gear sector 75 rotate with it to drive the roller or follower 78 around in the cam groove 79.

Loosely mounted on shaft 72 is an assembly comprising a gear 81 and a gear 82 which, as shown in Figure 10, are fastened to a hub 83 and accordingly rotate together. Gear sector 75 (Figure 4) meshes with gear 81, while gear 82 meshes with a large gear 84 which in turn meshes with a smaller gear 85 fastened to the spindle 86 on one end of which the film feed drive roller 58 is carried. It will now appear that upon operation of the mechanism in body 21 (Figure 1) disc 61 and accordingly shaft 62 and bevels 64 and 65 (Figure 11) are driven, causing rotation of gears 69 and 70. Thus gear 70, in turn, drives shaft 72, and as the shaft rotates, arm 73 carries gear sector 75 and cam follower 78 with it. This gear train is so proportioned that the arm 73 makes one rotation per cycle. As this arm rotates, gear 82 is given a motion consisting of the resultant of the motion of arm 73 about shaft 72 and the motion of sector 75 with respect to arm 73.

The position of these parts, as shown in Figure 4, corresponds to their position at the beginning or at the end of the cycle. In this position, as arm 73 rotates counterclockwise, roller 78 is forced toward the center of shaft 72 by groove 79 so that the motion of gear sector 75 with respect to arm 73 exactly cancels the motion of the arm. Therefore, gear 82 remains stationary during this initial movement. When arm 73 has rotated sufficiently for roller 78 to reach, for example, the position 78a, the path of the roller is changed so that the motion imparted to gear 82 by means of gear sector 75 operating through gear 81 will be added to the motion imparted to gear 82 due to the rotation of arm 73. If gear sector 75 were restrained from moving with respect to arm 73, the sector teeth would impart a motion to gear 82 exactly the same as the motion of arm 73. In other words, if roller 78 does not move closer to or farther from the center of shaft 72, the entire arm assembly will move as a unit, carrying gear 82 with it. If roller 78 is permitted to move closer to the center of shaft 72, it decreases the motion imparted to gear 82. If roller 78 moves away from the center of shaft 72, as arm 73 rotates the motion imparted to gear 82 is increased. Thus, as noted above, during the first few degrees of motion at the beginning of the cycle, roller 78 moves closer to the center of shaft 72 and at such a rate, by reason of the contour of groove 79, that gear 82 is not moved at all. Following this initial movement, the motion of the roller transversely of shaft 72 is controlled so as to accelerate gear 82 gradually until roller 78 reaches a position indicated approximately at 78b. From this position until the roller reaches the position indicated at 78c, the roller is forced outward from the center of shaft 72 at a constant velocity, and the relative motion of gear sector 75, with respect to arm 73, added to the motion of the arm itself, imparts a constant velocity to gear 82. From the position 78c to the position 78d of the roller, the roller is controlled in such a way as to effect the gradual deceleration of gear 82. From position 78d to its solid line position, roller 78 is moved closer and closer to the center of shaft 72, and at a constant rate designed to cancel exactly the rotated motions and leave gear 82 at rest. The solid line position of roller 78 represents the end of the cycle, as well as the beginning thereof.

Thus it will be seen that gear 82 throughout its operative cycle of one revolution is first slowly accelerated from a rest position, then driven at a constant velocity, and then decelerated until its motion ceases. A similar motion is accordingly imparted to gear 84, and by this gear to the film feed roller 58 through gear 85. It might be noted that the feed roller 58, as well as pressure roller 59, are both covered with rubber or similar material in order to increase the coefficient of friction thereof and thus hold the film slippage to a minimum to assure high accuracy of film metering during the cycle.

During the entire operative cycle of the magazine in which arm 73 makes one complete counterclockwise revolution coming to rest at the same position it occupied at the beginning of the cycle, it is obvious that gear 82 will also be given one complete turn counterclockwise. The motion of gear 82, however, does not start at the beginning of the cycle, and furthermore its motion is finished before the end of the cycle.

The gear ratio between gears 82, 84, and 85 is calculated to rotate the feed roller 58 sufficiently that its periphery will move the required amount of film during the cycle, and accordingly draw the appropriate amount from the supply spool 30 (Figure 2) through the magazine. This film must, of course, be wound on the take-up spool 31, and we have provided a mechanism to accomplish this which will now be described.

Film take-up mechanism

As shown in Figure 10, sub-assembly 35 includes a drum 87 loosely mounted on shaft 44, which as pointed out above carries pivot 45 at its inner end. The pivot supports the film take-up spool 31. Wrapped partially around drum 87 is a thin metallic strip or brake band 88 (Figure 4) one end of which is fastened as at 89 to casting 34. The other end of this brake band is secured to a rigid channel-shaped bar 90, the lower end of which is attached to a post 91 fixed to an arm 92, which arm is pivotally mounted on spindle 86 (Figures 2 and 9). Arm 92 (Figure 7) has its counterpart in an arm 94 at the opposite end of roller 60, and the free ends of these pivoted arms rotatably support the film tension roller 60 which, as shown in Figure 2, underlies the film strip F, as the film is wound on take-up spool 31. Suitable spring means (not shown) are provided for biasing the arms 92 and 94, and accordingly the tension roller 60, clockwise, as viewed in Figure 2, thus to tension the film between the feed roller 58 and the take-up spool 31.

The upper end of the brake band bar 90 is slidably disposed between a pair of fixed pins 95 and 96, and as arm 92 pivots counterclockwise under the tension of the film, pin 91 moves toward the take-up spool 31, thus permitting bar 90 to move to the left, which loosens the engagement between strip 88 and drum 87. The loosening of the engagement between strip 88 and drum 87 occurs when the slack in the film strip F has been substantially taken up. When there is too much slack in the film strip, then the spring bias on arms 92 and 94 pivots these arms clockwise, as viewed in Figure 2, which moves pin 91 away from the take-up spool 31 and accordingly tightens strip 88 about drum 87. As will be pointed out below, the loosening of the strip on the drum stops the feeding movement of the drum, whereas the tightening of the strip 88 on drum 87 causes the film take-up spool to be driven and hence to wind film thereon.

Referring to Figure 10, spindle 44 has pinned thereto a gear 97, the hub of which rotatably supports a gear 98 which meshes with gear 82 (see also Figure 4). Attached to gear 98 (Figures 8 and 10) are two studs 99 and 100, which rotatably carry meshing gears 101 and 102, respectively. Gear 101 also meshes with gear 97 while gear 102 meshes with a gear 103 which, as shown in Figure 10, is loosely mounted on spindle 44 and is attached to drum 87. Accordingly, it may be seen that as long as the brake band 88 is tight enough to hold drum 87 stationary, gear 103 is also held stationary. Since gear 82 (Figure 4) is rotated counterclockwise during the winding portion of the operative cycle, gear 98 is rotated clockwise. Hence, since gear 103 (Figure 4) is held stationary by drum 87, clockwise rotation will be given to gear 102 as its center is carried around the center of shaft 44 by reason of the rotation of gear 98. This causes gear 101 to rotate counterclockwise about its center, thus to impart clockwise rotation to gear 97 which, as noted above, is pinned to shaft 44 (Figure 10). Thus shaft 44 is caused to rotate and spool pivot 45 accordingly rotates the take-up spool 31, thus winding up the slack film onto the spool.

When the film slack has been entirely taken up, further rotation of the take-up spool 31 results in a tension in the film which presses the tension roller 60 (Figure 2) downwardly, causing the engagement between brake band 88 and drum 87 to slacken, as described above, thus permitting the drum 87 to rotate, rather than remain stationary. Of course, if the gear which rotates shaft 44 is not driven, the take-up spool remains stationary. The amount of the spring bias on arms 92 and 94 (Figure 7) tends to prevent any more film from being wound on spool 31, and the spool either then slows down or stops. As it slows down, shaft 44 (Figure 10) likewise slows down, as well as gear 103. If gear 97 slows down sufficiently or stops, gear 101 will have to rotate clockwise (Figure 8) as its center, which is mounted on gear 98, is moved clockwise about the center of shaft 44 (Figure 4) due to the driving force provided by gear 82 which, of course, cannot be stopped during the operative cycle. This clockwise motion of gear 101 (Figure 8) results in counterclockwise rotation of gear 102 which, in turn, results in clockwise rotation of gear 103 and accordingly drum 87 (Figure 10). However, since the brake band 88 is loose, the drum will revolve with no appreciable effort. Actually during the winding cycle, brake band 88 is neither tight nor completely loose. Hence drum 87 and gear 103 are permitted to slip somewhat so that shaft 44 is turned just enough to keep the slack out of the film by taking up this slack on spool 31 as fast as the film feed roller 58 (Figure 4) feeds film through the magazine. Also, the arms 92 and 94 (Figure 4) are held substantially in a position of equilibrium or balance in which the brake band 88 (Figure 4) is neither tight nor completely loose, as noted above. Thus the tension in the film is balanced by the force of the spring bias on arms 92 and 94. Inasmuch as this spring bias is relatively light, it results in a greater slipping of the clutch comprising brake band 88 and drum 87, so that the torque input to gear 98 is relatively light since it need be merely sufficient to maintain the above-mentioned tension in the film. Thus it will appear that the torque input to the film take-up spool driving mechanism is a function of the tension of the film between the film feed roller 58 and the take-up spool 31. It accordingly follows that the film take-up mechanism described comprises, in effect, a slipping clutch in which the transmitted torque may be controlled from an extremely low value to an extremely high value as load conditions change, by means of the slack in the film itself.

As noted hereinabove, trouble has been encountered in previous magazines of the character under consideration, particularly large magazines, whenever a large mass of film was used and/or whenever the film had to be wound in an extremely short period of time. It is apparent that the gear ratio to the take-up spool 31 must be sufficiently high to wind the entire length of film required during the permitted portion of the operative cycle with the take-up spool empty. This portion of the cycle may be somewhere around 300° of the input winding shaft. Near the end of the mission when a large diameter of film has been wound on the take-up spool, the entire length of film may be taken up in as little as 95°, where a spool of the large capacity contemplated herein is used. Since the speed of the input shaft remains constant, the film winding speed under these conditions is extremely high, which means simply that a greater load is applied to the mechanism at the instant the film is started. This also means that when the required length of film has been wound there is substantial momentum generated which must be absorbed in order to stop the film feed and take-up spools at the right time. Thus it follows that where the film is fed by means of roller 58 (Figure 8) the film is always moved its required length throughout the same portion of the cycle, regardless of the diameter of film on either the supply or take-up spools. This, of course, results in much less strain on the various parts of the operating mechanism of the magazine, and also in considerably less load on the camera drive mechanism in case drive 21 (Figure 1). Furthermore, through the provision of the gradual acceleration of the film feed drive mechanism at the beginning of the operative cycle, and the gradual deceleration at the end of the cycle, the driving mechanisms are not strained and peak loads are obviated. Furthermore, this gradual acceleration and deceleration of the film greatly lends to the accuracy of the film metering, as it precludes any possibility of the film's slipping between the film feed roll 58 and the pressure roll 59 (Figure 7).

*Film supply spool brake*

Inasmuch as it is of great importance that a new expanse of film be fed into proper exposure position in a very short period of time, substantial momentum is generated in the film supply spool 30, particularly when it is full of film, and the spool would, if left free to rotate, coast at the end of the winding cycle and permit enough slack to form which might either cause the film to be scratched or to become jammed in the magazine, or both. We have, accordingly, provided a supply spool braking mechanism which will now be described.

The supply spool braking system is shown in Figures 1, 2, 5, 6 and 12. As shown in Figure 12, the film supply spool spindle 39 is rotatably mounted in bushing 38 and on the spindle is pinned the hub of a drum 104. Encircling drum 104 is a brake band 105, one end 105a of which is attached to a stud 106 (Figure 2) mounted on bracket 32, the other end 105b of the brake band being attached to a rigid channel-shaped member 107 similar to channel member 90. This channel slidably extends through and is guided by a pair of spaced pins 108 and 109, secured to and extending from bracket 32, the other end of channel 107 being attached to a pin 110 (Figure 5) fastened to an arm 111, the lower end of which rotatably supports one end of roller 57. The upper end of arm 111 is pivotally secured, as by a screw 112 to a small bracket 113 which is fastened to the base casting 23. The opposite end of roller 57 (Figure 1) is mounted on a similar arm 114 pivoted to a similar bracket 115. These arms 111 and 114 are given a clockwise bias, as viewed in Figure 5, by a pair of springs 116 and 116a, the opposite ends of which are attached respectively to the arms and the brackets 113 and 115.

As shown in Figure 2, the film F is fed from supply spool 30 over and under roller 57 and accordingly the springs 116 and 116a tend to take up the slack in the film as the springs pull roller 57 to the left, as viewed in this figure. As soon as the film feeding mechanism starts to draw the film to the right, as viewed in Figure 5, roller 57 is pulled to the right against the bias of springs 116 and 116a, and as this happens, brake band 105 is released, thus to free drum 104 so that the film supply spool 30 (Figure 2) may rotate freely. As the film F stops moving, roller 57 (Figure 5) is pulled to the left by reason of the bias of springs 116 and 116a, and this movement of the roller being transmitted to arm 111, draws brake band 105 tightly around drum 104, thus immediately applying a braking force through the band to the drum and thence to the film supply spool 30. Thus the braking force applied to the film supply spool is determined directly by the film itself, and no slack can form subsequent to the feed portion of the operative cycle. When it is necessary for the film supply spool to turn, the braking force on this spool is almost completely removed, the force then immediately being applied to whatever extent is necessary to snub the spool quickly and permit any excessive slack from being created by the film spool coasting after the proper amount of film has been fed.

*Vacuum back*

At the end of the film feeding or winding cycle when the unexposed strip of film has been moved into position for exposure, it is necessary that the unexposed strip of film be held flat in the focal plane while the shutter is operated. To this end we have provided what may be termed a vacuum back of the type disclosed in United States Letters Patent No. 1,974,842, issued September 25, 1934, to William A. Black, which, in general, includes mechanism adapted to create a vacuum at the proper predetermined interval in the operative cycle of the camera for holding the film flat over the photographic exposure area during the photograph exposure interval. Our improved vacuum back and the operating mechanism therefor is shown in Figures 2, 5, 11, 14 and 15. As shown in Figure 14, focal plane casting 55 is provided with a series of longitudinal and lateral spaced grooves 117 which are formed in the casting by first machining the casting flat and then cutting the grooves in this flat face. These grooves, illustratively, may be on the order of three-eighths of an inch apart and on the order of twenty-five thousandths of an inch wide and twenty-five thousandths of an inch deep. As shown in this figure, the grooves terminate short of the edges of the casting, but are substantially coextensive therewith longitudinally and transversely. As shown in the lefthand portion of Figure 14, the top of casting 55 is provided with a number of channels 118 which are preferably cast integrally with the casting and lead to a common opening 119 which is located at the center of one side of casting 55. Channels 118 are covered by a sheet metal cover plate 120 which is secured to casting 55 by a plurality of screws 121 (see also Figure 15). Disposed between plate 120 and casting 55 is a gasket 122 to prevent the leakage of air from the channels 118.

At a plurality of points, illustratively eighteen, holes 123 are drilled from the top of casting 55 downwardly (see Figure 11) until they almost break through the bottom machined face of the casting. After these holes 123 are drilled, the bottom face of the casting is machined, as by a circular saw, to provide arcuate slots 124 (see also Figures 14 and 15) which break into the holes 123 thus placing the longitudinal and transverse slots 117 into communication with channels 118 by way of the slots 124 and holes 123. As shown in Figure 14, each of holes 123 communicates with one or more of channels 118, and accordingly the main opening 119 of the vacuum system is in direct communication with all of the slots 117. Thus this combination of grooves, holes and channels permits the evacuation of all space between the film and the lower face of casting 55, as viewed in Figure 11. Channels 118 (Figure 14) are so arranged that the cross-sectional area increases as air comes through the casting 55 at the various holes 123, and the channels are arranged in the shortest possible practical paths from these holes to the central opening 119 so that all of the air within this space may be evacuated in the shortest possible time and with the least possible pressure drop.

As shown in Figure 5, a valve generally indicated at 125 is provided for the vacuum back system and this valve includes a block 126 and a plunger 127 for controlling the connection to the various channels, holes and grooves in the vacuum back casting 55. Block 126 (Figure 6) is fastened to bracket 32 by screws 128, and this block includes a passageway 129 which communicates with a passageway 130 formed in a block 131 secured in any suitable manner to the opposite side of bracket 32. Block 131 includes a second passageway 132, the end of which communicates with the main opening 119 in the vacuum back casting 55 (see Figure 11) and thus communication may be had between valve 125 and the vacuum back by way of main opening 119 and passages 132, 130 and 129 in the two blocks 131 and 126. A third block 133 (Figure 6) is fastened, as by screws 134 to the outside of casting 23, this third block being provided with passages 135 and 136 and carrying a hose nipple 137 which communicates with passage 136. Passage 135 of block 133 communicates with another passage 138 in block 126 and thus communication may be had between the hose nozzle 137 and valve 125. A rubber hose (not shown) may be placed on nozzle 137 when the camera magazine is installed in the aircraft, for connecting the vacuum mechanism to a motor driven vacuum pump (not shown) or a Venturi tube (not shown). Plunger 127 (Figure 5) has a piston 127a fastened to or formed on the lower end thereof, and when this piston is in the position shown in Figure 5, air can pass freely from passage 130 (Figure 6) through passage 129 into a chamber 139 (Figure 5) thence out through passages 135 and 136 (Figure 6) in block 133 through nipple 137 and thence to the vacuum pump. Preferably rubber grommets 140 are used to seal the various connections between the drilled passages of the various blocks 126, 131 and 133. Thus it will appear that with the plunger in the Figure 5 position, the space between the back of the film and the bottom of the focal plane casting 56 can quickly be evacuated.

Referring back to Figure 5, gear 69 has a groove 141 formed in the face thereof which receives a roller 142 rotatably mounted on a pin 143 secured to an arm 144, the right-hand end of which is pivoted on a pin 145 mounted in and extending from side casting 34 (Figure 6). The left-hand end of arm 144 (Figure 5) has a slot 146 which receives a pin 147 fastened to the top of plunger 127. It will now appear that as gear 69 rotates during the operative cycle of the magazine, as heretofore described, arm 144 is rocked about the axis of pin 145 as roller 142 follows groove 141 in the gear, and the movement of the arm 144 controls the position of plunger 127 in accordance with the shape of groove 141. In Figure 5 position, the arm, and accordingly the plunger, are shown in the position in which they would rest when the magazine is in condition for taking pictures, i. e. at the end of the cycle. As soon as gear 69 starts to rotate clockwise, as viewed in Figure 5, at the beginning of the winding cycle, plunger 127 is moved downward by an amount sufficient to shut off the vacuum casting 55 from the source of vacuum and open it to the atmosphere by way of a hole 148 drilled through the side of block 126 into chamber 139. Thus air at atmospheric pressure may flow through hole 148 above piston 127a into chamber 139 and thence through passages 129, 130, 132 and main opening 119 into the vacuum casting 55 behind the film, thus to release the film so that it may easily be wound. After the film has been wound as heretofore described, and magazine coupling 61 has been rotated about 300°, groove 141 has been so rotated as to pivot arm 144 upwardly thus to raise plunger 127 and accordingly piston 127a to the Figure 5 position wherein the piston cuts off the bleeder hole 148 and reconnects the suction with the casting 55 as described. This 300° rotation leaves the last 60° of motion for flattening the film, the period of time consumed by this remaining amount of the motion being necessary to accomplish the flattening operation by means of a vacuum at very high altitudes.

*Light and air locks*

Large size aerial cameras are capable of taking pictures of substantial dimension, the exposure area being on the order of 9″ x 18″, and even larger. Where the film is nine or more inches in width, it is difficult to hold the film flat in the focal plane, as hereinbefore described, without excessive leakage of air into the space between the film and the vacuum back and light into the magazine. Unless leakage of air and light is prevented, the film cannot be held flat in the focal plane to prevent distortion, and the film in the magazine might become fogged. To the end of preventing this leakage we have provided, as shown in Figures 2, 3, 4 and 5, a pair of flippers 149 and 150 (Figure 2) disposed at the opposite ends of base casting 23 in transverse channels 151 and 152. By placing the flippers in channels 151 and 152, light entering the camera through the camera lens cannot readily pass around the flippers and then up into the magazine chamber where it could fog the entire roll of film. Thus the flippers extend entirely across the ends of the magazine and at the end of the operative cycle are in the slant position shown in Figure 2. With the flippers in this position, their elevated upper edges are pressed against the film, thus forcing the film upwardly against the bottom of the focal plane casting 55 (Figure 5) all the way across each end thereof. The grooves 23b (Figure 10) in base casting 23 guide the edges of the film and hold it close enough to the bottom of the focal plane casting 55 so that the air leakage around these edges is not excessive.

As flippers 149 and 150 are the same, only one of them, namely flipper 149, will be described. As shown in Figure 3, the opposite ends of flipper 149 are provided with pivot pins, such as pin 149a, which pins extend into the opposite side walls of base casting 23 so as to pivotally mount the flipper within its recess 151. Fastened to one end of the flipper is an angle arm 153 (Figure 2) to the upper end of which is attached a spring 154, the other end of the spring being fastened to a lever 155 pivoted as at 156 to bracket 113. This spring constantly biases flipper 149 counterclockwise (as viewed in Figure 2), i. e. into the slanted position shown wherein the elevated upper edge of the flipper presses the film against the focal plane casting. Flipper 150 (Figure 3) is similarly pivoted by pins, such as pin 157, and also has an angle arm 158 to which is attached a spring 159 (Figure 2) biasing this flipper clockwise into its slanted position.

During the winding portion of the magazine's operative cycle, it is necessary to rock flippers 149 and 150 from their slanted position to lower their elevated upper edges from the film. This movement of the flippers is accomplished by a rotatable cam 160 (Figure 3) which is fastened to and accordingly rotated by coupling shaft 62 (Figure 11) so as to make one complete rotation during each cycle of operation. Referring back to Figure 3, cam 160 rotates counterclockwise and accordingly starting from the position shown, forces the end 161 of a bell crank lever 162 outwardly or clockwise about its pivot 163 until the end 161 of the lever rides on the dwell 160a of the cam. Pivot 163 comprises a pin carried in a lever 164, which lever is pivoted on a stud 165 fastened to and extending upwardly from base casting 23. Lever 164, however, remains stationary during this initial clockwise rocking of bell crank 162. As the bell crank lever rocks, its slotted end 166 moves to the right, and as this end of the lever is fastened to a rod 167 by a pin 168 which extends through the slot in bell crank arm 166, the rod 167 is also moved to the right. The right-hand end of rod 167 is fastened to the upper end of a lever 169 pivotally mounted on a stud 170 fastened to the base casting 23 so that when the rod moves to the right, this lever 169 is rocked clockwise. The lower end of lever 169 is connected to arm 158 of flipper 150 by a rod 171 so that when lever 169 is rocked clockwise, as described, rod 171 is moved to the left, thus to rock flipper 150 counterclockwise, as viewed in Figure 2, to lower its elevated upper edge out of engagement with the film.

The left-hand end of rod 167 is pivotally fastened to a lever 172 pivoted on a stud 173 fastened to the base casting 23. The lower end of lever 172 is fastened as by a rod 174 to arm 153 of flipper 149. Thus it will follow that as rod 167 is moved to the right during the initial rotation of cam 160, as described, lever 172 is rocked counterclockwise, thus pulling flipper arm 153 clockwise, as viewed in Figure 2, to lower the elevated upper edge of flipper 149 out of engagement with the film. Hence with both of the flippers lowered, as described, the film may be fed freely through the magazine as heretofore described. By reason of the substantial extent of dwell 160a (Figure 3) on cam 160, the flippers are held in their lowered position during a sufficient portion of the operative cycle so as not to interfere with the feeding of the film through the magazine. After the proper amount of film has been metered through the magazine, cam 160 has rotated to the point where arm 161 (Figure 3) of bell crank 162 drops off cam dwell 160a. When this occurs, the lever system heretofore described operates in the opposite direction under the bias of springs 154 and 159 (Figure 2) to rock flippers 149 and 150, respectively, into their slanted position shown, wherein the film is again pressed tightly in proper position to prevent escape or leakage of air into the space between the film and the focal plane casting.

As shown in Figure 2, each of rods 171 and 174, as for example rod 174, is secured to its flipper arm by a nut and lock nut arrangement 175 to permit the adjustment of flippers 149 and 150 so that each will operate correctly while obviating the necessity of machining and assembling these parts to exceedingly close tolerances.

*Safety light lock*

The camera magazine 22 (Figure 1) may be detachably secured to the body 21 of the camera in any suitable manner, but preferably this is accomplished by means of a pair of oppositely disposed locking bars, such as bar 176 shown in Figure 10, which may be moved by suitable means (not shown) between the solid and dotted line positions; the solid line position being the magazine attaching position, and the dotted line position being that in which the magazine may be removed. Since magazine 22 as so far described is not provided with the conventional light slide, one exposure is allowed to become light struck at the time the magazine is removed from the camera. Ordinarily the magazine is at the end of its operative cycle when removed, which means that flippers 149 and 150 (Figure 2) are rocked to the slanted position shown. In this position, as pointed out before, the flippers prevent any light from getting past the ends of the exposed film area and around into the interior of the magazine where it would fog the film. It might occur, however, that the operator would stop with the camera partially wound and then remove the magazine, under which circumstances the flippers would not be in their slanted position so that light could enter the magazine past the flippers and fog the remaining film in the magazine. We have further provided a safety mechanism to cause the flippers to raise to the Figure 2 position, thus closing off any openings through which light might leak when the magazine is removed from the camera.

Locking bar 176 (Figure 10) when in its solid line position overlies a ledge 177 on base casting 23, and when the locking bar is in this position it presses against a pin 178 (Figure 3) to hold in the pin. When the locking bar is moved off the ledge, pin 178 is free and the pressure exerted by springs 154 and 159 (Figure 2) on the operating mechanism or flippers 149 and 150 pulls to the left on rod 174 and to the right on rod 171, pushing rod 167 (Figure 3) to the left, and accordingly end 166 of bell crank 162 also to the left. Since the end of the bell crank arm 161 is held by cam 160 from moving inwardly, pivot pin 163 is forced outwardly, i. e. away from rod 167. As noted before, lever 164 is pivoted to stud 165 so that lever 164 is rocked clockwise upon the above-described movement of pin 163. Lever 164 is attached to one end of a toggle 179, the center pivot 179a of which is fastened to pin 178. The other end of toggle 179 is fastened to a fixed pivot 180. Thus, when lever 164 is rocked clockwise, as described, the toggle is pulled, thus forcing pin 178 outwardly to permit springs 154 and 159 (Figure 2) to rock flippers 149 and 150 to the slant position shown, and thereby close up the gaps at the end of the exposure area.

*Magazine cover interlocks*

When the magazine is taken to the dark room for loading film, it is convenient to have the flippers in the horizontal position so that the film may easily be threaded through the magazine. To this end flipper arm 153 (Figure 2) includes a bent-up lip 181. Lever 155 includes a foot 182, the end of which is positioned close to lip 181. As shown in Figure 4, flipper arm 158 is also provided with a lip 183, which is disposed adjacent the foot 184 of a lever 185 which is similar to lever 155 (Figure 2). Foot 184 (Figure 4) of lever 185 is provided with a pin 186 to which is attached one end of a spring 187, the other end of which is attached to a fixed pin 188, the spring thus constantly biasing lever 185 clockwise, as viewed in Figure 4. A similar spring (not shown) is attached to the foot of lever 155 (Figure 2) and accordingly places this lever under a counterclockwise bias, as viewed in this figure. Accordingly, both of levers 155 and 185 if free to do so, may rock in the directions indicated so that their respective feet 182 (Figure 2) and 184 (Figure 4) press flipper arm lips 181 (Figure 2) and 183 (Figure 4) in such a manner as to rock the flippers out of their slanted positions, as viewed in Figure 2, so that the film may readily be threaded through the magazine.

As shown in Figure 2, levers 155 and 185 are respectively provided with outwardly extending arms 189 and 190, and these arms and accordingly the respective levers, are held in the position shown when cover 26 is on the magazine. However, when the magazine cover is removed in the dark room for unloading and reloading the magazine, lever arms 189 and 190 are free to move outwardly as the levers pivot under the bias of the springs attached thereto, as described above, to rock the flippers into horizontal position out of the way of the film.

The removal of cover 29 from the camera magazine performs another function. When arm 190 (Figure 4) for example, is in the position shown, and cover 29 is in place, a spring 191, which has one end attached to a pin 192 on a projection 193 of arm 190 pulls on another pin 194 to which the other end of the spring 191 is attached. This latter pin is fastened to an arm 195 which is pivoted on a stud 196. Arm 195 carries a stud 197 on which one end of pressure roller 59 is rotatably mounted. The other end of roller 59 (Figure 7) is similarly supported so that a spring 198, similar in deposition and function to spring 191, coacts with spring 191 to provide the tension which holds the pressure roller 59 against the film and against roller 58 so that the pressure roller bears with equal pressure throughout its length. When cover 29 is removed and arm 190 moves clockwise, as viewed in Figure 4, and as described above, a pin 199 mounted on the projection 193 of arm 190 moves to the right and engages the left-hand side of arm 195 to lift pressure roller 59 away from the film and from the feed roller 58. Thus when the cover 29 is removed from the magazine, the film may be threaded easily through the magazine and around and over feed roller 58 and under pressure roller 59. Preferably we provide a guide plate 200 which extends across base casting 23 in the corner thereof to guide the end of the film underneath roller 59 when cover 29 is off and the roller is out of its pressure position. Thus it will appear that removal of the magazine cover 29 automatically conditions the magazine for the ready passage therethrough of the leading edge of a new strip of film to facilitate reloading the magazine.

*Film feed indicator*

We have found it desirable to indicate whether or not the film is moving properly through the magazine during the winding portion of the cycle. To this end we have provided a small telltale 201 (Figure 2) which is disposed in a recess 202 (Figure 12) in the outside of the base casting 23. This telltale is carried on a shaft 203 rotatably mounted in a bushing 204 fastened to the side wall of base casting 23. The other end of shaft 204 supports a pulley 205 on which is trained a spring belt 206 (Figure 5) this belt also being trained on a pulley 207 mounted on the feed spool spindle 39 (Figure 12). Thus, as the film is fed through the magazine and the feed spool is accordingly caused to rotate, pulley 207, through belt 206, drives lower pulley 205 and accordingly rotates telltale 201 which indicates the movement of the film. If the film should break or for some other reason is not moving as it should, the telltale provides a ready indication to the operator that something is wrong. The telltale 201 is, of course, useful only when the camera is mouted in an accessible position wherein it is readily visible to the operator.

*Remote film feed indicator*

As noted above, the camera is frequently mounted in an inaccessible position in the airplane, and accordingly we have provided a remote indicator to indicate whether or not the film is moving through the magazine in proper fashion. This remote indicator includes an electric switch, generally indicated at 208 (Figures 5 and 12) having an actuating button 209 adapted to be depressed by a leaf spring 210 which is cyclically depressed by the high portion of an eccentric cam 211, which is fastened to pulley 205 and accordingly rotates therewith when the pulley is driven by belt 206. This switch 208 may be used to control a blinker light (not shown) at a remote station, and may also be used to control a remote solenoid operated counter (not shown) to record the number of exposures taken by the magazine.

When switch 208 is used to operate or control a remote solenoid operated counter, it is necessary that the switch close once during each cycle and then open again, i. e. the switch must operate once and only once for each magazine cycle. In this connection a stud 212 (Figure 5A) is fastened to casting 34 and extends inwardly thereof, and rockably mounted on this stud are a pair of arms 213 and 214. Arm 213 (Figure 5) includes a downwardly extending tail 215 which lies in the path of a pin 216 fastened to gear 69, which pin engages tail 215 once for every revolution of the gear to rock arm 213 about stud 212. The free end of arm 213 has fastened thereto one end of a spring, the lower end of which is attached to arm 218 of a counter 219 so that for every revolution of gear 69, counter 219 is actuated once, thus to show how many exposures have been taken.

As noted above, switch 208, when used to operate a remote solenoid operated counter, must operate once and only once for each magazine cycle. To this end, the diameters of pulleys 205 and 207 (Figure 12) are so selected that when the film supply spool is full, in which case it will have the smallest rotation for the full travel of the film, the telltale pulley 205 would ordinarily be driven more than one revolution. Accordingly a hub 220 (Figure 5A) is mounted on stud 212 and is fastened to both of arms 213 and 214. The extreme end of arm 214 (Figure 5) is provided with a projection 221 adapted to engage a notch 222 in the surface of cam 211. Arm 214 is in the position shown in Figure 5 at the end of the operative cycle or at the beginning thereof so that as the film supply spool begins to revolve the telltale 201 (Figure 12) is restrained by the projection 221, the spring belt 206 slipping on one or the other of pulleys 205 and 207. As arm 213 (Figure 5) is rotated clockwise, as described above, however, arm 214 being connected to arm 213 by hub 220 (Figure 5A) is lifted and the projection or tip 221 (Figure 5) is removed from notch 222 in cam 211. The arm tip is held clear of the cam permitting telltale 201 (Figure 12) to rotate for several degrees, as long as pin 216 (Figure 5) engages tail 215 of arm 213, and when the pin 216 passes tail arm 215, arm 213 is released and accordingly tip 221 of arm 214 drops back onto the surface of cam 211 but not into notch 222, as the notch is not in position to receive the arm tip at this time. A spring 223 has its upper end fastened to arm 214 and its lower end fastened to base casting 23, and accordingly constantly biases arm 214 counterclockwise to hold its tip 221 in engagement with cam 211. Cam 211, however, is rotated by spring belt 206 through one complete revolution, accordingly operating switch 208 a single time, as described above, and at the end of the cam's revolution, arm tip 211 drops into notch 222 to stop cam 211 against further rotation. From this point on to the end of the winding cycle, the spring belt 206 merely slips on one pulley or the other and accordingly the remotely controlled counter solenoid is operated but once per operative cycle of the magazine.

It will now appear that we have provided a camera magazine which attains the several objects set forth hereinabove in a thoroughly practical and efficient manner.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

We claim:

1. In camera construction, in combination, a cone member having a ledge formed on the top thereof, a film magazine member including a bottom casting adapted to be supported on said ledge, means on one of said members for detachably connecting both of said members, means in said magazine forming a focal plane in which a film is adapted to be positioned for exposure, means forming light locks at opposite ends of said focal plane and movable into engagement with said focal plane means to preclude entrance of light thereby into said magazine, and means on said magazine engageable with said first-mentioned means upon movement thereof to detach said members for effecting movement of said light lock means into engagement with said focal plane means.

2. In camera construction, in combination, a cone, a film magazine, means in said magazine forming a focal plane in which a film is adapted to be positioned for exposure, means forming light locks at opposite ends of said focal plane and normally in engagement therewith when the film magazine is detached from the cone to preclude entrance of light into said magazine, means for detachably securing said magazine on said cone, and means associated with said magazine and operable by said securing means when the magazine is secured to the cone for moving said light lock means out of engagement with said focal plane.

3. In camera construction, in combination, a cone, a film magazine, means in said magazine forming a focal plane in which a film is adapted to be positioned for exposure, means forming light locks at opposite ends of said focal plane and normally in engagement therewith when the film magazine is detached from the cone to preclude entrance of light into said magazine, means for detachably securing said magazine on said cone, means associated with said magazine and operable by said securing means when the magazine is secured to the cone for moving said light lock means out of engagement with said focal plane, and spring means associated with said light lock means for biasing said light lock means into light locking position.

4. In camera construction, in combination, a film supply spool, a film take-up spool, means defining an exposure area for film fed from one spool to the other, film feeding means for feeding film into said area, a stationary plate defining the focal plane of said camera coextensive with said area, means at the entrance and exit ends of said area for clamping the film against said plate after film has been fed into said area, said clamping means comprising elongated bars pivotally mounted at opposite ends of said plate and movable toward and away therefrom whereby upon movement of said bars toward said plate the film is clamped thereagainst, and means forming an operative connection between said clamping bars and said film feeding means and effective only during the latter portion of the operative cycle of said film feeding means for effecting clamping operation of said clamping means.

5. In camera construction, in combination, a base, a film magazine, film supply and take-up spools rotatably mounted in said magazine, a detachable cover for said magazine, means detachably mounting said film magazine on said base, means in said magazine forming a focal plane in which a film is adapted to be positioned for exposure, means forming light locks at opposite ends of said focal plane forming means and movable into locking position to preclude entrance of light into said magazine, means responsive to detaching operation of said first-mentioned means for effecting movement of said locking means into their locking position, and means responsive to removal of said cover from the magazine for effecting movement of said locking means out of their locking position.

6. In a camera construction, in combination, a cone, a magazine detachably mounted on said cone, supporting structure in said magazine, film supply and take-up spools rotatably mounted on said structure, a frame-like base underlying said structure, said base including means forming guides on opposite sides thereof for guiding the edges of the film during its passage from one spool to another, a stationary vacuum back resting on said base beneath said spools and adjacent said guide means, said vacuum back defining the focal plane of the camera, and means disposed at the entrance and exit ends of the focal plane and extending transversely of a strip of film and responsive to detachment of the magazine from said cone for engaging the film lying under the vacuum back and pressing it upwardly against the vacuum back to preclude entrance of light between the film and vacuum back.

7. In a camera magazine adapted to be detachably mounted on a cone, the combination of, supporting structure, film supply and take-up spools rotatably mounted on said structure, a frame-like base underlying said structure, said base including means forming guides on opposite sides thereof for guiding the edges of the film during its passage from one spool to another, a stationary vacuum back resting on said base beneath said spools and adjacent said guide means, said vacuum back defining the focal plane of the camera, means disposed at the entrance and exit ends of the focal plane and extending transversely of a strip of film for engaging the film lying under the vacuum back and pressing it upwardly against the vacuum back to preclude entrance of air between the film and vacuum back when the vacuum back is operated to draw the film flat thereagainst, and means responsive to removal of the magazine from said cone for effecting film engaging operation of said film engaging means, thereby to preclude entrance of light into said magazine.

8. In a camera magazine adapted to be detachably mounted on a cone, the combination of, supporting structure, film supply and take-up spools rotatably mounted on said structure, a frame-like base underlying said structure, said base having a passageway formed therein along which the film may move from one spool to the other, a stationary vacuum back resting on said base and forming a top to said passageway, and means disposed at the entrance and exit ends of said passageway and extending transversely of said vacuum back and movable into and out of blocking position relative to the entrance and exit ends of said passageway, thereby to preclude the entrance of light into the magazine when moved into blocking position.

9. In a camera magazine adapted to be detachably mounted on a cone, the combination of, supporting structure, film supply and take-up spools rotatably mounted on said structure, a frame-like base underlying said structure, said base having a passageway formed therein along which the film may move from one spool to the other, a stationary vacuum back resting on said base and forming a top to said passageway, means disposed at the entrance and exit ends of said passageway and extending transversely of said vacuum back and movable into and out of blocking position relative to the entrance and exit ends of said passageway, thereby to preclude the entrance of light into the magazine when moved into blocking position, and means responsive to the removal of the magazine from said cone for effecting movement of said blocking means into blocking position to preclude entrance of light into said magazine when it is removed from said cone.

10. In a camera magazine adapted to be detachably mounted on a cone, the combination of, supporting structure, film supply and take-up spools rotatably mounted on said structure, a frame-like base underlying said structure, said base having a passageway formed therein along which the film may move from one spool to the other, a stationary vacuum back resting on said base and forming a top to said passageway, means disposed at the entrance and exit ends of said passageway and extending transversely of said vacuum back and movable into and out of blocking position relative to the entrance and exit ends of said passageway, thereby to preclude the entrance of light into the magazine when moved into blocking position, means responsive to the removal of the magazine from said cone for effecting movement of said blocking means into blocking position to preclude entrance of light into said magazine when it is removed from said cone, a cover detachably mounted on said magazine, and means responsive to removal of said cover from said magazine for moving said light blocking means out of light blocking position.

IRVING W. DOYLE.
REGINALD A. WHITE.